United States Patent
Yoo et al.

(10) Patent No.: US 6,379,073 B1
(45) Date of Patent: Apr. 30, 2002

(54) ADJUSTABLE JOINT FOR A POSITIONABLE ARM

(75) Inventors: Woo Sik Yoo, Palo Alto, CA (US); Hiromitsu Kuribayashi, Sagamihara (JP)

(73) Assignee: WaferMasters Incorporated, San Jose, CA (US)

( * ) Notice: Subject to any disclaimer, the term of this patent is extended or adjusted under 35 U.S.C. 154(b) by 0 days.

(21) Appl. No.: 09/541,865

(22) Filed: Apr. 3, 2000

(51) Int. Cl.[7] ................................................ F16C 11/06
(52) U.S. Cl. ..................... 403/90; 403/31; 248/288.31
(58) Field of Search .......................... 403/90, 84, 56, 403/31, 37, 38, 39, 122; 248/288.31, 288.51, 181.1; 269/75

(56) References Cited

U.S. PATENT DOCUMENTS

| | | | |
|---|---|---|---|
| 1,829,964 A | * 11/1931 | Randall | 403/38 |
| 3,319,982 A | * 5/1967 | Schwartz | 403/90 |
| 3,638,973 A | 2/1972 | Poletti | 285/184 |
| 3,908,926 A | 9/1975 | Ochs et al. | 242/72 B |
| 4,785,528 A | 11/1988 | Soderberg | 29/701 |
| 4,863,133 A | * 9/1989 | Bonnell | 248/280.11 |
| 4,974,802 A | * 12/1990 | Hendren | 248/181.1 |
| 5,020,933 A | * 6/1991 | Salvestro et al. | 403/90 |
| 5,118,058 A | 6/1992 | Richter | 248/183 |
| 5,280,892 A | * 1/1994 | Smith | 269/75 |
| 5,544,968 A | * 8/1996 | Goellner | 403/90 X |
| 6,213,671 B1 | * 4/2001 | Chang | 403/84 |

FOREIGN PATENT DOCUMENTS

| | | | |
|---|---|---|---|
| DE | 38 41 744 | 7/1989 | ............ B25H/1/18 |
| WO | WO 91/05960 | 5/1991 | ........... F16C/11/10 |

* cited by examiner

Primary Examiner—Harry C. Kim
(74) Attorney, Agent, or Firm—Skjerven Morrill MacPherson LLP; Theodore P. Lopez

(57) ABSTRACT

A positionable arm composed of multiple member segments connected by an adjustable joint which may be fixedly positioned and repeatedly repositioned. The first member includes an end portion defining a first connector opening and an inner surface defining a chamber. A slideable piston provided in the first member includes a first end and a second end, the first end being adjacent the chamber and creating a seal along the inner surface of the first member. A rotatable connector is received in the first member between the second end of said piston and the end portion of the first member, and a second member is attached to the rotatable connector. To position the arm, a pressurized fluid source supplies compressed air to the chamber, which presses the piston against the rotatable connector, fixedly clamping the connector between the piston and the end portion of the first chamber.

5 Claims, 3 Drawing Sheets

ADJUSTABLE JOINT FOR A POSITIONABLE ARM

BACKGROUND

1. Field of the Invention

This invention relates to an adjustable joint for coupling two segments of a positionable arm. More specifically, this invention relates to a joint for coupling two segments forming a positionable arm that can be fixedly positioned and repeatedly repositioned.

2. Description of Related Art

Various types of positionable arms are known. These arms typically use motors or mechanical friction caused by, for example, the tightening of screws or bolts, to maintain the orientation of the arm. Such arms may include a plurality of arm segments connected by adjustable joints, thereby providing multiple degrees of freedom with which to arrange the arm. Positionable arms can be used in any number of applications, such as where a workpiece or tool is attached to the end of the positionable arm and the user must reposition the tool periodically during use. In such an application, it is important that the arm, when positioned, fixedly retain that position during use, while still allowing for relatively easy repositioning when desired.

Positionable arms which maintain their positions using friction created between arm members by tightening screws are disadvantageous because in order to reposition the tool, the frictional retaining force must be overcome by the repositioning force applied by the user. This type of apparatus is impractical where the tool being suspended is sufficiently heavy that the downward force caused by the weight of the tool is roughly equivalent to or greater than the force that is applied by the user. Thus, the necessary amount of friction required to prevent movement of the heavily-weighted arm interferes with the user's ability to easily reposition the tool. Accordingly, there is a need for a positionable arm which can fixedly maintain a position while under load, but is easily repositionable by hand.

SUMMARY

In accordance with the present invention, an adjustable joint is provided, comprising a first member having an inner surface and an end portion defining a first connector opening, a piston having a first end and a second end, a chamber within the first member defined by the first end of said piston and the inner surface of the first member, a rotatable connector received in the first hollow member between the second end of said piston and the end portion of the first hollow member such that an increased pressure in the chamber urges the piston towards the first connector opening, thereby clamping the rotatable connector between the first connector opening and the second end of said piston, and a pressurized fluid source in fluid communication with the chamber.

A spring may be provided in the chamber, said spring providing a force against said piston such that said piston presses against said rotatable connector, thereby providing a frictional resistance to rotation of said rotatable connector.

In accordance with another aspect of the present invention, a method for locking and unlocking a joint is provided. This method comprises providing a first member having an inner surface and an end portion defining a first connector opening, a piston in said first member, said piston having a first end and a second end, said first end of said piston and said inner surface of said first hollow member defining a chamber, joining said first member with a second member using a rotatable connector, arranging said rotatable connector in said first member between said second end of said piston and said end portion of said first member, increasing a fluid pressure in said chamber, said increased fluid pressure urging said piston towards said first connector opening, thereby clamping said rotatable connector between said first connector opening and said second end of said piston, and decreasing said fluid pressure in said chamber, thereby decreasing the clamping applied to said rotatable connector by said first connector opening and said second end of said piston.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
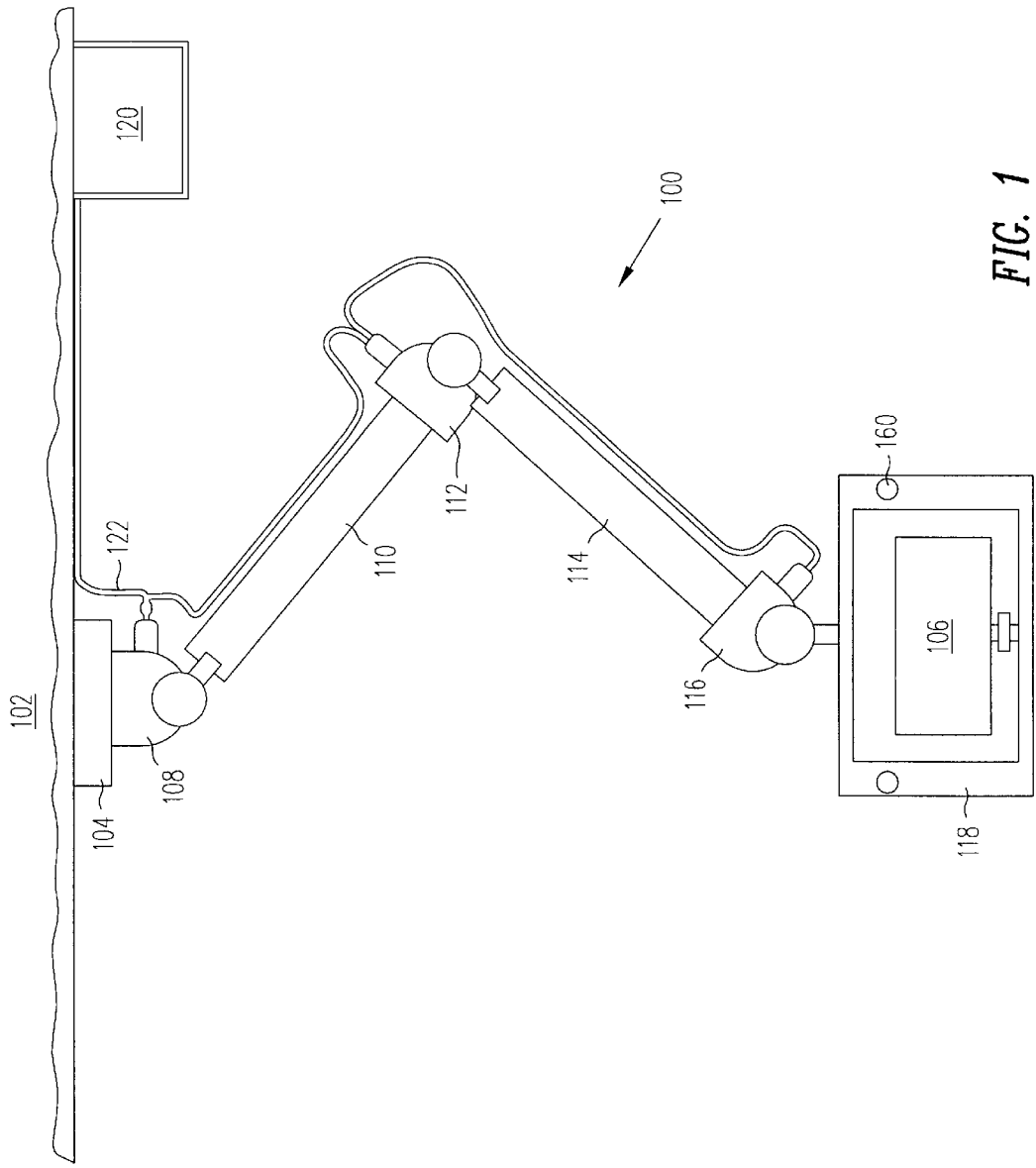
FIG. 1 shows a positionable arm in accordance with an embodiment of the present invention.

In accordance with an embodiment of the present invention, a positionable arm 100 is shown in FIG. 1. Arm 100 is mounted to ceiling 102 through ceiling mount portion 104, and hangs downward therefrom to suspend workpiece 106. Arm 100 may be mounted in any orientation, such as from a vertical wall, or may rest on the floor in the workspace area. First joint 108 connects ceiling mount 104 to first arm segment 110, first arm segment 110 is connected to second arm segment 114 through second joint 112, and second arm segment 114 is connected to tool mount 118 through third joint 116. The joints and arm segments can be made of various type of materials, including metals, such as aluminum alloys or steel. Each arm segment 110, 114 could be made in any length and any size, depending on the application.

A pressurized fluid source 120 feeds pressurized fluid through tube 122 to first joint 108, second joint 112, and third joint 116. It will be understood that the term "fluid" refers to both liquid and gaseous fluids. In the embodiment illustrated in FIG. 1; pressurized fluid source 120 is a compressed air generator, and ambient air is used as the pressurized fluid which is provided in tube 122. Although FIG. 1 shows an externally mounted tube 122, it is also possible to incorporate tube 122 in the interior of arm 100 as will be described below.

Figure 2:
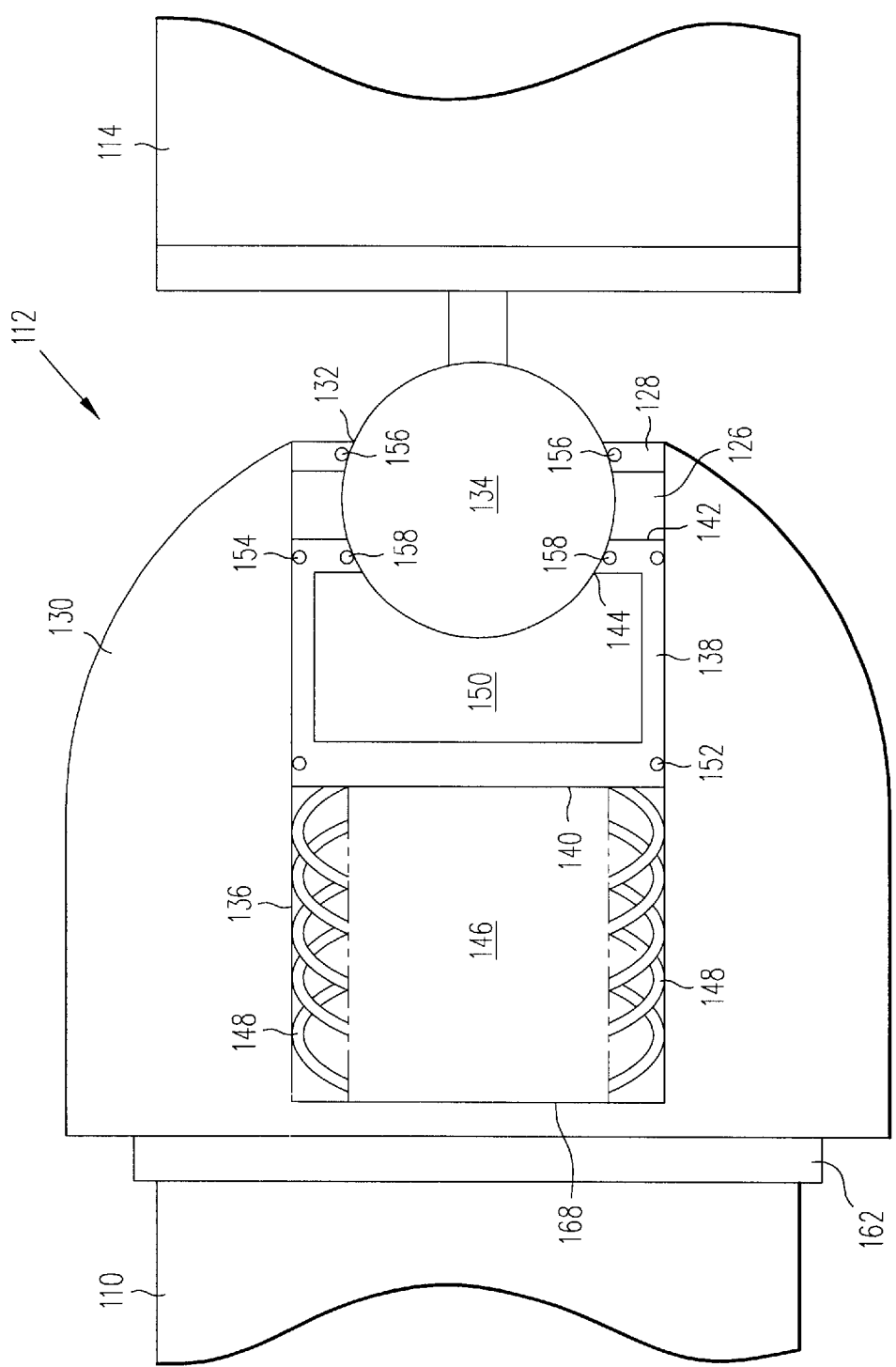
FIG. 2 shows a cross-section of a joint member in the positionable arm of FIG. 1.

FIG. 2 is a cross-sectional view of joint 112. Hollow member 130 contains rotatable connector 134 and includes a head plate 128, which defines first connector opening 132. Rotatable connector 134 protrudes through first connector opening 132 to attach to second arm segment 114. Hollow member 130 has an inner surface 136, which defines an interior region containing slideable piston 138. Piston 138 has a first end 140 and a second end 142. First end 140 of piston 138, inner surface 136, and back wall 168 define a chamber 146. First gasket 152 provides a seal around first end 140 and second gasket 154 provides a seal around second end 142, thereby enabling piston 138 to slide laterally within hollow member 130 while providing an airtight seal for chamber 146.

Second end 142 defines a second connector opening 144, which abuts rotatable connector 134. First connector opening 132 of hollow member 130 abuts an opposite side of connector 134. Thus, rotatable connector 134 is positioned between first connector opening 132 and second connector opening 144 of piston 138, being held securely in place by the two connector openings 132, 144. In another embodiment, second end 142 is solid and has a contour which matches the shape of connector 134, thereby increasing the contact area between second end 142 and connector 134.

Spring 148 is provided within chamber 146 in a compressed state such that spring 148 provides a constant pressure against piston 138, pressing piston 138 against connector 134. Tube 122 feeds pressurized fluid into chamber 146 and interior 150 of piston 138 through valves (not shown). Release valves (not shown) are also provided in chamber 146 and interior 150 of piston 138 to enable depressurization of these two regions.

The operation of joint 112 is as follows. The bias provided by compressed spring 148 exerts a constant force on piston 138, pressing second connection opening 144 of piston 138 against connector 134. This pressure creates a frictional resistance between the rim of second connector opening 144 and connector 134 and between the rim of first connector opening 132 and connector 134, thereby opposing rotation of connector 134. Connector gaskets 156, 158 may also be provided on first and second connector openings 132, 144 to either increase or decrease the rotational resistance.

In order to fix joint 112 in a particular orientation, pressurized fluid is provided from source 120 into chamber 146. Controls 160 provided on tool mount 118 control the valves leading to chamber 146, thereby controlling the flow of fluid into and out of chamber 146. The increased pressure within chamber 146 combines with the force applied by spring 148 to press the second end 142 of piston 138 against connector 134, clamping connector 134 firmly between second connector opening 144 and first connector opening 132. The amount of rotational resistance created by this clamping depends upon a number of factors, such as the fluid pressure within chamber 146, the preset compression of spring 148, the effectiveness of the seal around piston 138 in preventing fluid leaks, and the coefficient of friction between the connector openings 132, 144 and connector 134. The coefficient of friction depends upon the materials used for these features and the contact surface area of openings 132, 144 with connector 134. Numerous materials can be used for these components, such as an O-ring made of rubber or plastic.

Each arm segment 110, 114 could be made in any length and any size, depending on the application. The size of the arm segments 110, 114 and the weight of the workpiece 106 can affect the internal pressures necessary to maintain the arm 100 in a stationary position. In one embodiment, each arm segment 110, 114 is approximately 100 cm long, workpiece 106 weighs approximately 20 kg, and the pressure within chamber 146 is 50 kg/cm$^2$.

To reposition joint 112, some of the fluid within chamber 146 is released, equalizing the pressure between chamber 146 and the region 126 between head plate 128 and second end 142, and thereby decreasing the pressure against piston 138. The force from spring 148 continues to be applied against piston 138 to maintain some clamping force against connector 134. This clamping force created by spring 148 provides a default rotational resistance in joint 112, which provides sufficient rigidity to the arm structure to enable accurate repositioning when arm 100 is heavily loaded. Without this default resistance, the user would receive no assistance in supporting the weight of arm 100 together with the weight of the workpiece 106 at the end of arm 100. Where arm 100 and workpiece 106 are significantly heavy, the user may not be able to support the weight, or may have to struggle to support the weight while attempting to reposition arm 100. Thus, the default resistance provided by spring 148 is selected based on the desired application. Some pressure differential between chamber 146 and region 126 may be maintained to increase the default rotational resistance.

According to another aspect of the present invention, the user may wish to adjust the rotational resistance of joint 112 to a level of resistance lower than the default resistance provided by spring 148. In such a situation, fluid passes from pressurized fluid source 120 into interior portion 150 of piston 138, increasing the pressure within interior portion 150 to a level greater than that of chamber 146 and region 126. This increased pressure within interior portion 150 creates a pressure against the portion of connector 134 received in second connector opening 144. This drives piston 138 away from connector 134, opposing the force applied by spring 148. Thus, as the pressure within interior portion 150 is increased, the rotational resistance of joint 112 decreases.

Connector 134 may be provided in the shape of a cylinder or a sphere. When connector 134 is spherical, openings 132, 144 are formed in a circular shape and joint 112 is capable of movement and rotation in any direction. Alternatively, when connector 134 is cylindrical, openings 132, 144 are rectangular, and the direction of movement for joint 112 is limited to rotation about the axis of cylindrical connector 134. A bearing 162 may also be provided to allow rotation of joint 112 about the longitudinal axis of first arm segment 110, thus enabling greater range of movement for cylindrical connectors.

First joint 108 and third joint 116 are similar to joint 112, as discussed above. Each joint 108, 112, 116 receives pressurized air from pressurized fluid source 120 through externally-mounted tube 122. In one embodiment, controls 160 on tool mount 118 include independent controls for the valves and air flow into each joint 108, 112, 116, enabling the user to adjust the resistance and reposition each joint independently of the others. Alternatively, controls 160 may simply control all of the collective internal air pressures within joints 108, 112, 116. In another embodiment, the mechanical pressurized fluid source 120 illustrated in FIG. 1 is replaced with a manually-operated hand pump located on tool mount 118.

Figure 3:
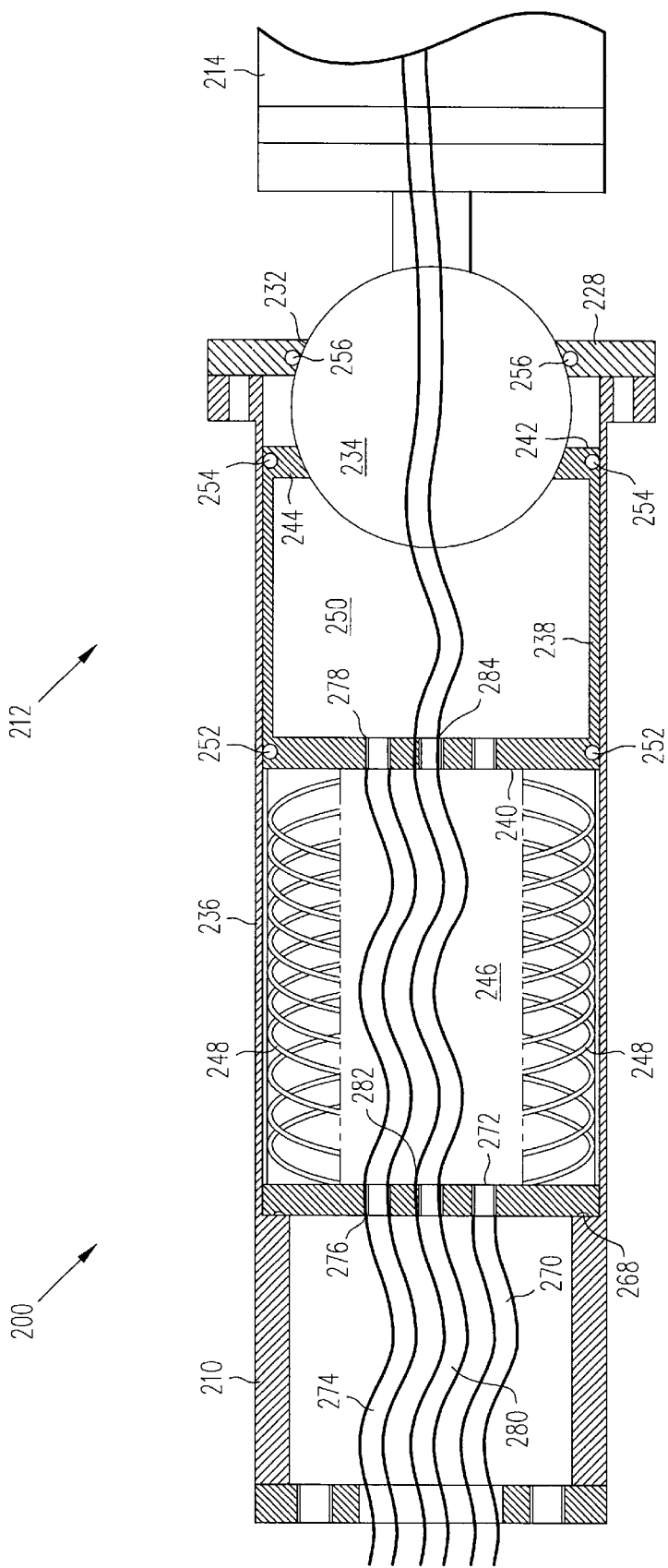
FIG. 3 shows another embodiment of a joint member in accordance with the present invention.

Another embodiment of an adjustable joint 212 in accordance with the present invention is illustrated in FIG. 3. Here, first arm segment 210 is joined to second arm segment 214 through joint 212. First arm segment 210 is hollow with an interior surface 236 which contains piston 238. A first end 240 of piston 238, interior surface 236, and back wall 268 define chamber 246. Springs 248 in chamber 246 apply a force on piston 238, urging it in the direction of connector 234 and clamping connector 234 between first connector opening 232 in head plate 228 and second connector opening 244 in second end 242 of piston 238. First gasket 252, second gasket 254, and connector gasket 256 provide seals between various moving parts within joint 112.

The operation of adjustable joint 212 is similar to that of joint 112, except that unlike tube 122, the tubes which feed pressurized fluid to joint 212 are located on the interior of the arm. First tube 270 is connected to a pressurized fluid source and provides compressed air through opening 272 in back wall 268 into chamber 246. Second tube 274 is also connected to a pressurized fluid source and carries compressed air through opening 276 in back wall 268 and opening 278 in first end 240 into the interior portion 250 of piston 238. Finally, third tube 280 travels compressed air through opening 282 in back wall 268, opening 284 in first end 240, and through opening 286 in connector 234 to provide compressed air from the pressurized fluid source into joints that are located farther along the positionable arm. Where multiple fluid sources are needed downstream of joint 212, tube 280 may comprise a bundle of tubes. Valves (not shown) may also be provided at openings 272, 276, 278, 282, 284, and 286 to control the airflow to the various regions of the positionable arm.

Although the invention has been described with reference to particular embodiments, the description is only an example of the invention's application and should not be taken as a limitation. In particular, even though much of preceding discussion was aimed at adjustable mechanical arms, alternative embodiments of this invention may be used wherever positionable joints are use. Various other adaptations and combinations of features of the embodiments disclosed are within the scope of the invention as defined by the following claims.

We claim:

1. An adjustable joint, comprising:
   a first hollow member having an inner surface and an end portion defining a first connector opening;
   a piston having a first end and a second end;
   a chamber within said first hollow member defined by said first end of said piston and said inner surface of said first hollow member;
   a rotatable connector received in said first hollow member between said second end of said piston and said end portion of said first hollow member such that an increased pressure in said chamber urges said piston towards said first connector opening, to clamp said rotatable connector between said first connector opening and said second end of said piston;
   a pressurized fluid source in fluid communication with said chamber;
   a spring in said chamber, said spring providing a force against said piston such that said piston presses against said rotatable connector, thereby providing a frictional resistance to rotation of said rotatable connector; and
   a second connector opening in said second end of said piston, a portion of said rotatable connector being received in said second connector opening;
   wherein said pressurized fluid source is in fluid communication with an interior portion of said piston such that increased pressure within said piston creates a pressure against said portion of said rotatable connector being received in said second opening to counteract the force provided by said spring.

2. The adjustable joint of claim 1, wherein:
   said rotatable connector is cylindrical; and
   said first and second connector openings are rectangular.

3. The adjustable joint of claim 1, wherein:
   said rotatable connector is spherical; and
   said first and second connector openings are circular.

4. The adjustable joint of claim 1, further comprising a second member attached to said rotatable connector.

5. A method for locking and unlocking a joint, comprising:
   providing a first hollow member having an inner surface and an end portion defining a first connector opening, a piston in said first hollow member, said piston having a first end and a second end, said first end of said piston and said inner surface of said first hollow member defining a chamber;
   joining said first hollow member with a second member using a rotatable connector;
   arranging said rotatable connector in said first hollow member between said second end of said piston and said end portion of said first hollow member;
   increasing a fluid pressure in said chamber, said increased fluid pressure urging said piston towards said first connector opening, to clamp said rotatable connector between said first connector opening and said second end of said piston;
   decreasing said fluid pressure in said chamber, to decrease the clamping applied to said rotatable connector by said first connector opening and said second end of said piston;
   applying a constant force on said piston towards said rotatable connector so as to create a default rotational resistance for said rotatable connector;
   receiving a portion of said rotatable connector in a second connector opening provided in said second end of said piston; and
   increasing a pressure within an interior portion of said piston above a pressure within said chamber such that said increased pressure within said piston creates a pressure against said portion of said rotatable connector received in said second connector opening to counteract the constant force applied on said piston.

* * * * *